April 29, 1930.   H. KLOPSTOCK   1,756,516
CUTTING TOOL
Filed Nov. 14, 1923
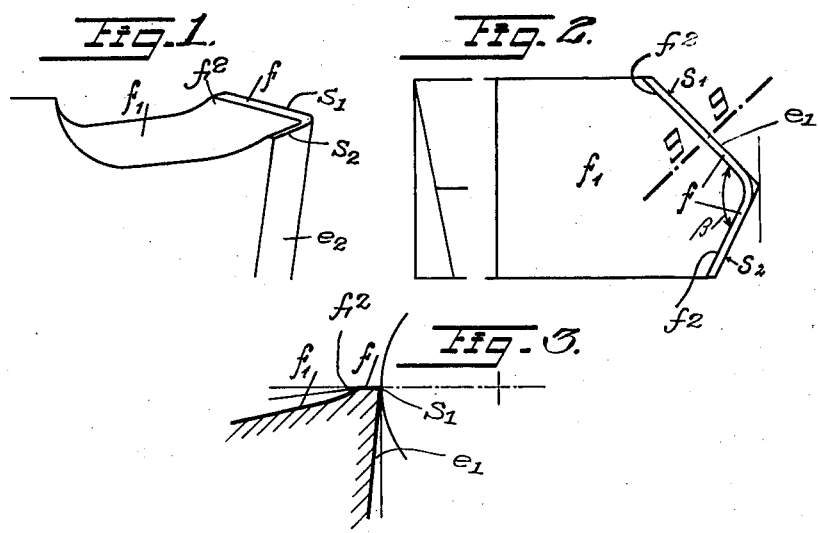

Patented Apr. 29, 1930

1,756,516

UNITED STATES PATENT OFFICE

HANS KLOPSTOCK, OF BERLIN, GERMANY

CUTTING TOOL

Application filed November 14, 1923, Serial No. 674,672, and in Germany January 15, 1923.

My invention relates to improvements in cutting tools such as are used for planing, turning or finishing blanks of metal or other material, and the object of the improvements is to reduce the power required for detaching the cutting and the heat generated by cutting the blank. With this object in view my invention consists in the matters to be described hereinafter and particularly pointed out in the appended claims.

The value of a cutting edge of such tools is determined by the power required in turning, planing and so forth, by the length of its life, i. e., its ability to stand up in severe service without breaking or becoming dull, and by its resultant increased output. The use of a large breast angle, i. e., the vertical angle formed by the end face or clearance surface of the tool with the upper or lip surface thereof, strengthens the cutting edge but, with the tools used heretofore, results in greater power requirements for the same amount of work done and in the generation of excessive heat, due to causes mentioned below, which is detrimental to the cutting edge. On the other hand, lower power requirements with the tools used heretofore have been secured by using a small breast angle which, however, greatly interfered with the life of the cutting edge, mainly on account of its mechanical weakness due to this small angle and of the lack of sufficient metal to carry the heat away from the cutting edge. The practice sometimes resorted to of breaking the very edge between lip and clearance surfaces, by means of a grindstone, does not change the weakness of this form of tool materially.

It has been further suggested to use tools which in shape are duplicates of worn tools, in other words, which embody in the lip surface a depression like that in time produced in this surface by the chip. Even this form does not insure highest cutting efficiency as my extensive investigations have shown and as will be realized from the most salient results of these investigations which will be mentioned below and which have led to the present invention.

Referring now to the attaching drawings which embody my invention:

Fig. 1 is a perspective view showing a part of a cutting tool embodying my cutting edge in one particular form.

Fig. 2 is a top plan view of the tool, and

Fig. 3 is a section taken on line 9—9 of Fig. 2.

The said tool has cutting edges $s_1$ and $s_2$, which are formed by the meeting of their respective clearance surfaces $e_1$ and $e_2$ which are formed on the end of the tool, with the lip surface $f$ on the upper side of the tool. In this particular embodiment of my invention, which I have chosen for illustration, the lip surface, which in tools as commonly used extends some distance back from the cutting edge, in my tool is cut away to form a depression $f_1$ which leaves a narrow strip of metal, preferably of uniform width and parallel to the cutting edge. Thus there is left a substantial, though limited, strip of lip surface adjacent to the cutting edge, and there is formed a shoulder $f_2$ at the back of said lip surface where said lip surface and the wall of the depression meet.

The strip $f$ in this particular form of tool follows the whole length of cutting edge $s_1$, which may be the leading cutting edge, the whole length of cutting edge $s_2$ which is intended as the rear cutting edge, and the rounded part which joins the two cutting edges. This strip $f$ is, as stated, preferably of substantially uniform width over its whole length or at least as far as the active part of the cutting edge extends, and its width is preferably less than one-eighth inch.

The breast angle, i. e., the vertical angle between the plane of the raised strip $f$ and the clearance surface or end surface of the tool, which with the lip surface forms the cutting edge, can without detriment, be larger than now is customary.

In order to clearly explain wherein the action of my cutting tool differs essentially from that of previous tools, it is necessary to enter more fully into the process of cutting based on years of scientific investigations which I have conducted.

A chip or cutting in what is generally called metal cutting, is formed by a large number of individual chip elements broken off the work piece and having a more or less solid connection among themselves. The process of turning, for example, consists in separating, consecutively, these individual chip elements from the work-piece, and in leading off the resulting cutting formed by the connected chips. The process of separating the individual chip elements, as my long investigations have shown, consists mainly in four operations: first, an initial compression of material in front of the tool, which has remained after the previous chip element has been broken off; second, in starting a slight initial tear between the main part of the work-piece and the small part which is to form the chip element; third, in compressing and bending this small part; and fourth, in breaking it off the work-piece, except for a partial connection remaining between it and the part which is to form the next chip element. The problem is to effect the separation with as little compression as possible, since the latter increases the power requirements and the heat produced, and to do so without sacrificing the life of the cutting edge.

With tools of long life as used heretofore, i. e. tools having large breast angles, a large compression of the chip element before it will separate from the work-piece is unavoidable, for the reason that with these tools the force tending to break off the chip element is working under very unfavorable conditions.

In connection with the second main part of the turning process, namely the disposal of the chip, large breast angle tools as used heretofore are also inefficient, since, generally speaking, the friction between the chip and the lip or upper surface of the tool increases with the size of the breast angle. This friction increases the power requirements and the heat produced.

My invention aims to produce a tool having the advantages of the large breast or "contained" angle but working at the same time with high efficiency in breaking off the chip elements and leading off the chip. It embodies a large breast angle, and consequently a cutting edge which is mechanically strong, and a special form of lip surface which is of such a form that it will assist in breaking off the chip elements without excessive compression and to avoid interference with the free flow of the complete cutting sufficiently so as not greatly to wear the tool or compress the cutting.

In tools used heretofore employing unbroken lip surfaces adjacent to the cutting edges, it has been observed, particularly in heavy roughing work, that cavities develop within the lip surface, such cavities beginning near the cutting edge. I have as a result of my observations developed the tool above described, embodying a lip surface consisting of a narrow raised strip adjacent to the cutting edge and extending over its entire active length, and of a depressed part of sufficient dimensions, in the direction of the flow of the chip, to guide the latter without undue friction or interference.

I have found that it is advisable to connect the depressed part with the raised strip by means of a fillet in such a manner that the angle formed by the surface of the raised strip and a surface tangential to the fillet at its intersecting point with the strip surface will not become too small, even after several regrindings of the strip surface. The most advantageous width of the raised strip varies, according to my investigations, with the size of the chip but even with very heavy work it should—on the basis of present materials—be less than one-eighth of an inch. The extension of the depressed part of the lip surface should, as I have found, be large in comparison to the difference in level between the raised strip and the depressed part, which difference for best operating efficiency, strength, heat conduction and also for other reasons, must be kept within moderate dimensions. The exact form of the depressed surface, however, is not vital; it may be straight, slightly concave, and slanting slightly in one or the other direction without materially affecting the result.

Since my form of lip surface as described changes materially the inter-action of chip elements, chip and lip surface, I am enabled to use, with many kinds of work, larger breast angles than generally practicable heretofore, with the beneficial results indicated before.

The peculiar function of the raised strip, of the depressed part of the lip surface and of the shoulder formed by the intersection of the strip surface and the fillet will be apparent from what has been said before. After the initial rift caused as the result of the wedge action of the shoulder formed by the raised strip and the clearance surface, the metal to be separated is bent and slides away from the cutting edge. It is apparent that with proper width of the raised strip its shoulder will help in breaking off the small part of the work-piece adjacent to the tool, and in fact the observation in tests and practical operations confirm this; with a raised strip of proper width and a properly designed fillet the wear on these tools begins at the shoulder of the raised strip, i. e. at the line where the depression begins. A further advantage of the depression $f_1$ is clear from the illustration. The individual chip elements, jointly forming the chip, find little resistance from and easy guidance by the depressed surface if the same extends far enough.

From the above it will be clear that best results will be secured if the raised strip extends over substantially the whole active part of the cutting edge, be this formed by straight front and rear cutting edges intersecting at some angle and joined by a short curve, as is shown in the drawing or by any continuous curve, round, elliptical, or any other form; in fact the whole cutting edge may be one straight line which is cheaper and often quite sufficient in the case of light finishing work or its equivalent.

With the particular design of tool here shown, I have found it advantageous to place the two cutting edges $s_1$ and $s_2$ at an angle to each other, of at least 90 degrees, as this will assist the free flow of the chip. In all these cases, however, the raised strip should be of substantially equal width along the whole active cutting edge, preferably less than one-eighth inch wide. The depression should be of sufficient dimensions, in the direction of the motion of the chip, to permit its free flow, and the depressed portion should be joined to the raised strip by means of a fillet. These are characteristics of my invention.

The primary functions of the depression are to form the shoulder $f_2$ and to avoid the presence of metal which would unduly interfere with the flow of the chip or cutting. Thus, so long as the strip $f$ be present with sufficient metal to carry away heat from the cutting edge, and with an upper surface and shoulder to make the initial rift and deflect the chip without undue compression, and so long as no metal is present to thereafter cause heat and wear by unduly opposing the flow of the cutting, it is not essential to my invention whether any depression as such be present.

My experiments and the use of my tools in general daily factory use have proven beyond doubt that, on the basis of equal lasting qualities and on the basis of equal power requirements, my cutting edge will remove, in a given time, an amount of material exceeding that removed with conventional tools, by thirty or fifty or more per cent, depending on the conditions.

In addition I have found that some materials which were extremely hard to work heretofore, can be worked with my cutting edge with much less difficulty.

Various modifications may be made without departing from the spirit thereof. The present exemplification is to be taken as illustrative and not as limitative.

I claim:

1. A metal cutting tool, the upper face of which is provided with intersecting blunt cutting edges, each of said cutting edges being formed by a strip, said strips having a shoulder parallel to said cutting edges, a depressed portion being formed back of said shoulders and a fillet connecting the shoulder and depressed portion, said fillet being of smaller radius than would be worn by a chip in a face without a depression.

2. A metal cutting tool, the upper face of which is provided with intersecting cutting edges, each of which is formed by a strip, each strip having a shoulder parallel to its cutting edge, a depressed portion being formed back of said shoulders and a fillet connecting the shoulder and depressed portion, said fillet being of smaller radius than would be worn by a chip in a face without a depression, the metal supporting said cutting edge being thick enough to carry away the heat fast enough substantially to prevent injury to said cutting edge.

3. A metal cutting tool, the upper face of which is provided with intersecting cutting edges, each of said cutting edges being formed on a strip, each of said strips having a shoulder parallel to its cutting edge, a depressed portion being formed back of said shoulders and a fillet connecting the shoulder and depressed portion, said fillet being of smaller radius than would be worn by a chip in a face without a depression, the metal supporting said cutting edge being substantially as thick as the distance between the cutting edge and the shoulder.

In testimony whereof I hereunto affix my signature.

HANS KLOPSTOCK.